(12) United States Patent
Sosale et al.

(10) Patent No.: US 9,958,337 B2
(45) Date of Patent: May 1, 2018

(54) PROTECTIVE TUBE DEVICE FOR PROTECTING A TEMPERATURE SENSOR AGAINST CONTACT WITH A FLUID

(71) Applicant: ABB TECHNOLOGY AG, Zurich (CH)

(72) Inventors: Guruprasad Sosale, Weinheim (DE); Andrea Pozzi, Villa Guardia (IT); Paul Szasz, Plankstadt (DE); Thomas Scholl, Karlsruhe (DE); Wilhelm Daake, Petershagen (DE)

(73) Assignee: ABB Schweiz AG, Baden (CH)

( * ) Notice: Subject to any disclaimer, the term of this patent is extended or adjusted under 35 U.S.C. 154(b) by 253 days.

(21) Appl. No.: 14/817,243

(22) Filed: Aug. 4, 2015

(65) Prior Publication Data

US 2016/0041040 A1    Feb. 11, 2016

(30) Foreign Application Priority Data

Aug. 6, 2014 (DE) .................. 10 2014 011 724

(51) Int. Cl.
*G01K 1/08* (2006.01)
*G01L 19/06* (2006.01)

(52) U.S. Cl.
CPC ............ *G01K 1/08* (2013.01); *G01L 19/0645* (2013.01)

(58) Field of Classification Search
CPC .................. G01L 19/0046; G01L 19/0645
See application file for complete search history.

(56) References Cited

U.S. PATENT DOCUMENTS

| 6,425,293 B1 * | 7/2002 | Woodroffe | .......... G01F 23/0076 |
| | | | 73/708 |
| 7,866,214 B2 * | 1/2011 | Banholzer | .......... G01L 19/0092 |
| | | | 73/714 |
| 9,459,170 B2 * | 10/2016 | Haywood | .............. G01L 9/0041 |

FOREIGN PATENT DOCUMENTS

| DE | 102007035812 A1 | 2/2008 |
| WO | WO 2013143748 A1 | 10/2013 |

* cited by examiner

*Primary Examiner* — Clayton E Laballe
*Assistant Examiner* — Leon W Rhodes, Jr.
(74) *Attorney, Agent, or Firm* — Leydig, Voit & Mayer, Ltd.

(57) ABSTRACT

A protective tube device can protect a temperature sensor against contact with a fluid, and has a distal end containing the temperature sensor and has an outer wall provided for contact with the fluid, and a proximal end which is connected to the temperature sensor by electric lines and is intended for arrangement outside the fluid, wherein, on the outer wall of the distal end, an elastic membrane closes off a resultantly defined pressure transmission fluid reservoir in a fluid-impermeable manner, the pressure transmission fluid reservoir being connected fluidically by a fluid channel running within the protective tube device to a pressure sensor arranged in the proximal end.

10 Claims, 1 Drawing Sheet

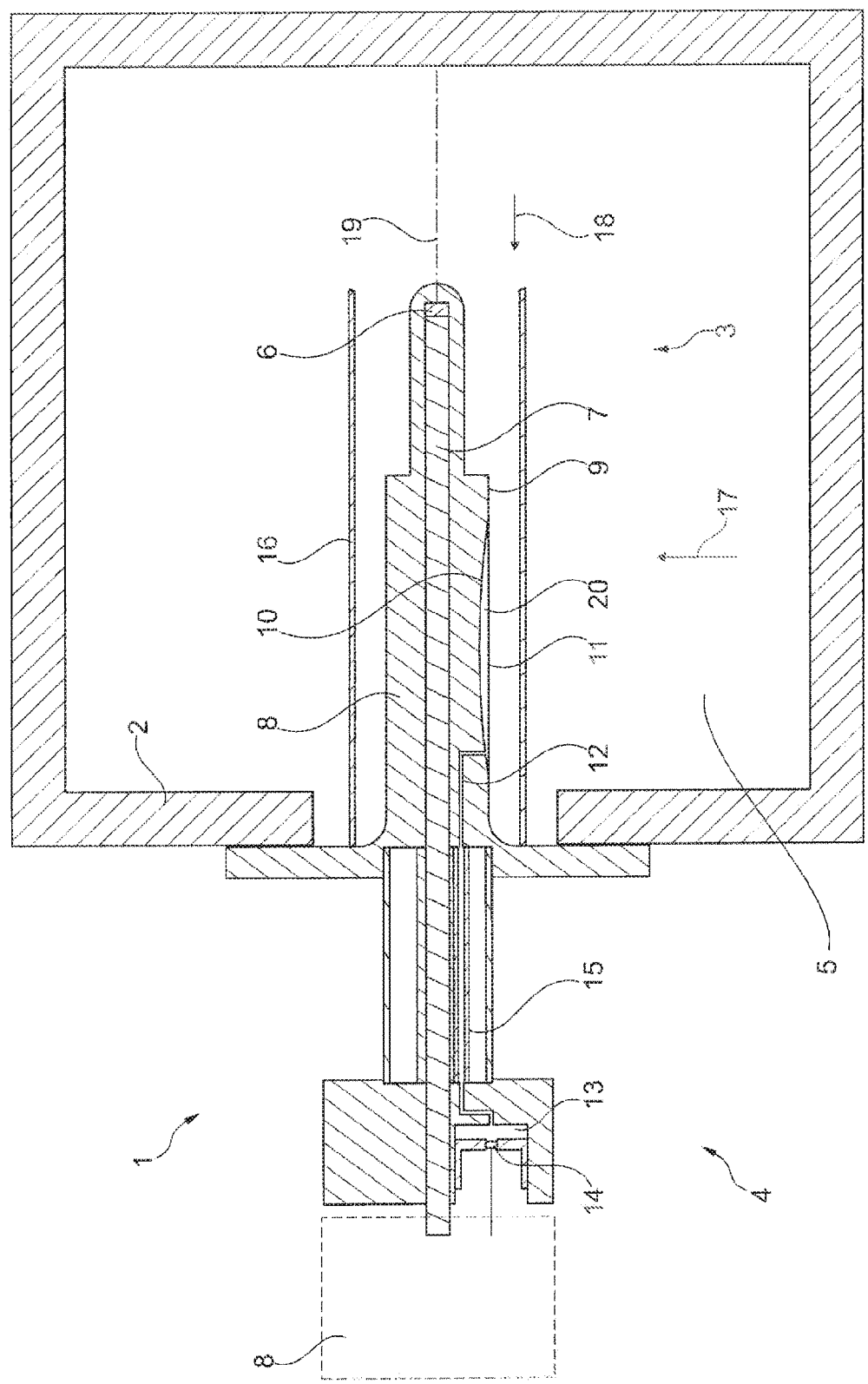

PROTECTIVE TUBE DEVICE FOR PROTECTING A TEMPERATURE SENSOR AGAINST CONTACT WITH A FLUID

CROSS-REFERENCE TO RELATED APPLICATIONS

Priority is claimed to German Patent Application No. DE 10 2014 011 724.3, filed on Aug. 6, 2014, the entire disclosure of which is hereby incorporated by reference herein.

FIELD

The invention relates to a protective tube device for protecting a temperature sensor against contact with a fluid.

BACKGROUND

The field of use of the invention extends to process plants in which properties of fluids, such as, for example, temperature and pressure, are measured in order, for example, to increase the efficiency of a process or to keep to safety-relevant parameter intervals. The measurement of, for example, thermodynamic parameters of a fluid may also be of interest in non-industrial plants, for example in research, and in other fields of use. If the fluid is under pressure in relation to the atmosphere, the fluid has to be surrounded by a housing which is impermeable to the fluid. In order nevertheless to be able to make statements about the fluid contained in the housing, in the prior art use is made, for example for measuring the temperature, of protective tube devices which project at a proximal end out of the housing and project at a distal end into the housing such that the outer wall of the distal end comes into contact with the fluid within the housing.

In addition to such protective tube devices which are suitable, for example, for measuring the temperature via a temperature sensor accommodated in the distal end, the generally known prior art has also disclosed protective tube devices, such as, for example, Pitot tubes, which are suitable for measuring static and dynamic pressure or the total of static and dynamic pressure. However, the use of different measuring instruments within a housing is complicated, inter alia, because of the necessity of a connection adapted to the measuring instrument, i.e. an opening, in the housing wall.

Dynamic pressure is understood as meaning the pressure which arises because of a directed flow and which exerts a force and therefore a pressure, while static pressure arises because of the isotropic, collectively undirected particle movements in a fluid.

SUMMARY

An aspect of the invention provides a protective tube device for protecting a temperature sensor against contact with a fluid, the device comprising: a distal end including the temperature sensor and including an outer wall configured to contact the fluid; and a proximal end, connected to the temperature sensor by one or more electric lines, suitable for arrangement outside the fluid, wherein, on the outer wall of the distal end, the outer wall includes an elastic membrane closes off a pressure transmission fluid reservoir in a fluid-impermeable manner, wherein the pressure transmission fluid reservoir is defined by the elastic membrane and the outer wall, wherein the pressure transmission fluid reservoir is connected fluidically by a fluid channel to a pressure sensor arranged in the proximal end, and wherein fluid channel the runs within the protective tube device.

BRIEF DESCRIPTION OF THE DRAWINGS

The present invention will be described in even greater detail below based on an exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a longitudinal section through a protective tube device for attaching to a housing with fluid contained therein.

DETAILED DESCRIPTION

An aspect of the invention provides a device which is insertable into an individual connection of a housing containing a fluid, and which permits both a measurement of the temperature and also of the static or of the dynamic pressure.

An aspect of the invention provides a protective tube device for protecting a temperature sensor against contact with a fluid, comprising a distal end containing the temperature sensor and having an outer wall provided for contact with the fluid, and a proximal end which is connected to the temperature sensor by electric lines and is intended for arrangement outside the fluid.

An aspect of the invention incorporates the technical teaching that on the outer wall of the distal end, an elastic membrane closes off a resultantly defined pressure transmission fluid reservoir in a fluid-impermeable manner, the pressure transmission fluid reservoir being connected fluidically by a fluid channel running within the protective tube device to a pressure sensor arranged in the proximal end.

An advantageous aspect of this invention consists, for example, in that a modification, which can be carried out with little outlay, of a protective tube device typical in the prior art for measuring the temperature of a fluid is supplemented by an entirely novel function which is independent of the original purpose of the protective tube device. In particular, a spatial separation of the fluid and the pressure sensor is introduced by the channel which leads from the distal end to the proximal end, as a result of which it is possible to accommodate the pressure sensor in the proximal end, in which the temperature-sensitive electronics or the electronic interfaces of the protective tube device are already arranged, while the pressure transmission fluid reservoir projects separately through the membrane into the fluid and is exposed there to the optionally high temperatures without being damaged.

A measure improving the invention makes provision for the outer wall of the distal end of the protective tube device to have a substantially circular cross section. Such a shape can be produced in a particularly simple manner and can likewise be inserted in a simple manner into circular openings in the housing surrounding the fluid.

Furthermore preferably, the protective tube device is designed in such a manner that it tapers in a stepped or continuous manner from the region in which it is incorporated into the housing as far as the distal end. This means that the protective tube device has a relatively large cross section in the region of the connection in the housing and therefore has high, for example, also mechanical, stability while having a small cross sectional area in a distal region, i.e. projecting further into the fluid, as a result of which, firstly, the mechanical resistance against flows of the fluid is minimized, and as a result of which the temperature sensor in the distal end is also arranged closer to the fluid and can therefore supply more precise and less delayed information regarding the temperature of the fluid.

The pressure transmission fluid which is placed into the channel and the pressure transmission fluid reservoir is preferably incompressible, for example is an oil or a silicone fluid or water. It is thereby ensured that the pressure in the fluid surrounding the distal end of the protective tube device is applied to the pressure sensor in the proximal end without delay and without a substantial change in pressure.

In a particularly preferred embodiment of the invention, the outer wall of the distal end has a depression in the region closed off by the membrane, and therefore, as a result, the volume of the pressure transmission fluid reservoir is increased. This reservoir is formed by the space between membrane and outer wall of the protective tube device, with a greater volume of said reservoir permitting a greater dynamic range of the pressure measurement.

A depression which has an oval edge, preferably an elliptical edge, is particularly preferred here. The depression here can be designed, for example, to be continuous or stepped. Such an oval or elliptical shape is suitable in particular with regard to the fact that said shape is covered on a cylindrical outer wall by a membrane.

It is furthermore possible to influence the flexibility and therefore the sensitivity or other dynamic properties of the membrane in conjunction with the depression via the contours of membrane or depression.

The invention is additionally improved by a measure in which a flow shield is arranged at least in the region of the membrane, in order to protect the membrane against dynamic pressure by means of flows of the fluid. It is frequently desirable to filter out such local flows during a pressure measurement. Owing to the fact that the flow shield proposed here is arranged in the region of the membrane, for example connected fixedly to the housing or the protective tube device, said flow shield is capable of keeping flows of the fluid away from the membrane. Since the membrane continues to be in contact with the fluid, the static pressure will act without change on the membrane.

The flow shield is preferably designed as a hollow cylinder, preferably a hollow circular cylinder, and surrounds at least part of the distal end of the protective tube device at least laterally in parts. For example, the flow shield can therefore be designed as a hollow circular cylinder which is arranged concentrically with respect to the cylindrical protective tube device and laterally has a distance of, for example, a few mm or cm. The distance can be adapted here depending on the fluid parameters to be anticipated, such as viscosity and flow velocity.

The flow shield is particularly preferably connected to the protective tube device in a region proximal to the membrane. This means that the fluid can only enter at the distal end of the protective tube device into the region between flow shield and protective tube device, and therefore a continuous flow along the protective tube device is not possible. As a result, action upon the membrane by dynamic pressure is particularly reliably ensured.

The flow shield is preferably connected exchangeably here to the protective tube device, i.e., for example, can be fastened and released by means of screw connections or clamping connections. Specifically in the case of chemically corrosive fluids, or in the case of fluids having a very high temperature, a damaged flow shield can therefore optionally be easily exchanged.

Further measures improving the invention are illustrated in more detail below together with the description of a preferred exemplary embodiment of the invention with reference to the single FIGURE.

According to the FIGURE, a protective tube device 1 which is attached in a housing 2 comprises a distal end 3 and a proximal end 4. The distal end 3 is located here within the housing 2 and therefore projects into the fluid 5 contained in the housing 2. In the tip of the distal end 3 of the cylindrical protective tube device 1 there is a temperature sensor 6 which is connected by electric lines 7 to electronics 8 (not illustrated in detail) in the proximal end 4 of the protective tube device 1.

Within a part 8 of the distal end 3 which is widened in order to increase the mechanical stability of the protective tube device 1, according to the invention a depression 10, which is elliptically curved in all section planes in this case, is let into the outer wall 9 of the distal end 3. Said depression 10 is covered by an elastic membrane 11.

Adjacent to the depression 10, a channel 12, which is bent at a right angle, leads from the depression 10 through the interior of the distal end 3 of the protective tube device 1 as far as the proximal end 4 of the protective tube device 1, where the channel 12 opens into a pressure chamber 13 which is bounded by a pressure sensor 14. Said pressure sensor 14 is electronically connected to the electronics 8 (not illustrated further) which are also connected to the temperature sensor 6. A change in the pressurization of the membrane 11 by the fluid 5 is therefore transmitted virtually without delay through the channel 12 to the pressure sensor 14.

A modularly exchangeable channel extension 15 connects the distal end 3 here to the proximal end 4 such that a long channel extension 15 can be selected, for example in the event of very high temperatures of the fluid 5, in order thereby to reduce the temperature of the pressure transmission fluid contained in the channel 12 in the region of the pressure sensor 6.

A hollow-cylindrical flow shield 16 is additionally attached concentrically to the distal end 3 of the protective tube device 1, wherein the flow shield 13 bears against a part of the protective tube device located proximally to the membrane 11. As a result, flows which are formed with a direction 17 perpendicular to the longitudinal axis 19 of the protective tube device 1 are kept entirely away from the membrane 11, and flows which are formed with a direction 18 parallel to said longitudinal axis 19 are likewise substantially kept away.

The invention is not restricted to the above-described exemplary embodiment. On the contrary, modifications thereof which are also included by the scope of protection of the claims below are also conceivable.

For example, it is thus also possible for the pressure transmission fluid reservoir to be formed circumferentially around the distal end of the protective tube device.

It is also possible for the depression to have a different shape or for a depression to be entirely omitted if the membrane then protrudes convexly from the outer wall of the protective tube device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

| LIST OF REFERENCE NUMBERS | |
|---|---|
| 1 | Protective tube device |
| 2 | Housing |
| 3 | Distal end |
| 4 | Proximal end |
| 5 | Fluid |
| 6 | Temperature sensor |
| 7 | Electric lines |
| 8 | Electronics |
| 9 | Outer wall |
| 10 | Depression |
| 11 | Membrane |
| 12 | Channel |
| 13 | Pressure chamber |
| 14 | Pressure sensor |
| 15 | Channel extension |
| 16 | Flow shield |
| 17 | Direction perpendicular to the longitudinal axis |
| 18 | Direction parallel to the longitudinal axis |
| 19 | Longitudinal axis |
| 20 | Transmission fluid reservoir |

The invention claimed is:

1. A protective tube device for protecting a temperature sensor against contact with a fluid, the device comprising:
a distal end including the temperature sensor and including an outer wall configured to contact the fluid; and
a proximal end, connected to the temperature sensor by one or more electric lines, suitable for arrangement outside the fluid,
wherein, on the outer wall of the distal end, the outer wall includes an elastic membrane that closes off a pressure transmission fluid reservoir in a fluid-impermeable manner,
wherein the pressure transmission fluid reservoir is defined by the elastic membrane and the outer wall,
wherein the pressure transmission fluid reservoir is connected fluidically by a fluid channel to a pressure sensor arranged in the proximal end,
wherein the fluid channel runs within the protective tube device,
wherein the outer wall of the distal end includes a depression in a region closed off by the elastic membrane, thereby increasing a volume of the pressure transmission fluid reservoir, and
wherein an edge of the depression is of oval shape.

2. The device of claim 1, wherein the outer wall of the distal end has a substantially circular cross section.

3. The device of claim 1, having a smaller cross sectional area in a distal region of the distal end than in a proximal region of the distal end.

4. The device of claim 1, wherein the pressure transmission fluid reservoir and the fluid channel include a pressure transmission fluid comprising an oil, silicone fluid, water, a further incompressible liquid, or a mixture of two or more of any of these.

5. The device of claim 1, further comprising:
a flow shield, arranged at least in the region of the elastic membrane,
wherein the flow shield is configured to protect the membrane against dynamic pressure of flows of the fluid.

6. The device of claim 5, wherein the flow shield is hollow-cylindrical, and
wherein the flow shield at least partially laterally surrounds the distal end of the device.

7. The device of claim 5, wherein the flow shield ends with the device in a region proximal to the elastic membrane.

8. The device of claim 5, wherein the flow shield is fastened exchangeably to the device.

9. The device of claim 5, wherein the flow shield is hollow-cylindrical, and
wherein the flow shield laterally surrounds the distal end of the device.

10. The device of claim 5, wherein the flow shield is fixed exchangeably to the device.

* * * * *